Patented Oct. 22, 1940

2,218,663

UNITED STATES PATENT OFFICE 2,218,663

DYESTUFFS OF THE DIBENZANTHRONE SERIES

Otto Stallmann, Bridgeton, N. J., assignor to E. I. du Pont de Nemours & Company, Wilmington, Del., a corporation of Delaware No Drawing. Application January 20, 1939, Serial No. 251,962

8 Claims. (Cl. 260—338)

This invention relates to the preparation of new and valuable dyestuffs of the dibenzanthrone series, and more particularly to the preparation of new alkylation derivatives of Bz-2,Bz-2'-dihydroxydibenzanthrone which are obtained by reacting the same with halogen alkanes or halogen alkenes of the general formula:

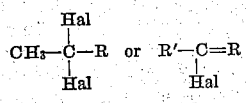

in which R stands for an alkyl or alkylene radical which may be further substituted by halogen, and R' stands for —CH₃ or —CH₂—Hal. These new alkyl ethers of dihydroxydibenzanthrone are believed to have the following general formula:

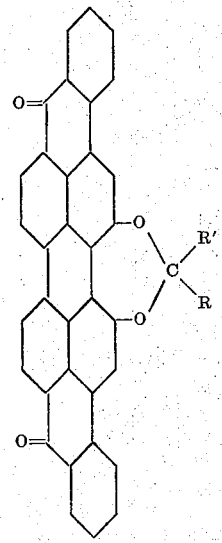

in which R and R' have the same significance as above.

In the original U. S. Patent 1,531,261 directed to the preparation of alkyl derivatives of oxidized dibenzanthrone, the alkylating agents employed were in the main those which contained only a single halogen or other replaceable group on a single carbon atom. These products dye in green to blue shades. Two exceptions, however, are disclosed in the class of alkylating agents, namely, methylene dibromide and benzal chloride, which, however, were both found to give dyestuffs which are not fast to water-spotting and are very deficient in light fastness. The methylene dibromide gives a compound which is said to dye in violet shades. These compounds, however, which contain two halogen atoms attached to a single carbon, have been found to be of no commercial value.

I have found that new and valuable dyestuffs of this series can be obtained by reacting Bz-2,Bz-2'-dihydroxydibenzanthrone with alkylating agents of the general formulas above indicated, and that by such alkylations new blue dyestuffs are obtained of desirable shades and superior tinctorial strength to the known blue vat dyestuffs of this series, and which have a light fastness equal to the light fastness of the best dyestuff of the alkylated dihydroxydibenzanthrone series.

A great deal of effort has been expended in an endeavor to prepare blue dyestuffs of the dibenzanthrone series which would approach the brightness in dyeing and printing shades of the blues of the indanthrone series, and which would be superior to those dyestuffs in bleach fastness, for it has been found that the blue dyestuffs of the indanthrone series are very desirable in shade and brightness but are deficient in bleach fastness. While a number of dyestuffs of U. S. Patent 1,531,261 are described as dyeing in blue and reddish blue shades, it has been found that all of the known alkylation products of dihydroxydibenzanthrone which dye in blue shades are dull and do not approach the shade of the indanthrone blues.

It is, therefore, an object of this invention to prepare new alkyl derivatives of Bz-2,Bz-2'-dihydroxydibenzanthrone which dye in desirable blue shades of good fastness properties and which are equal or superior in tinctorial strength to the known dyestuffs of this series.

It is a further object of this invention to prepare new blue vat dyestuffs of the dibenzanthrone series which approach in tone and brightness the dyeing and printing shades of the indanthrone dyestuffs but which are absolutely fast to bleach. According to the present invention, Bz-2,Bz-2'-dihydroxydibenzanthrone, preferably in the form of the alkali metal salts, may be reacted in the presence of alkaline condensing agents with aliphatic halogen compounds containing from 2 to 6 carbon atoms of the formula:

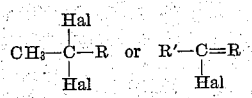

in which R stands for alkyl or alkylene radicals which may be further substituted by halogen, and R' stands for —CH₃ or —CH₂—Cl. It has been found that those aliphatic halogen compounds which contain two halogen atoms on different carbon atoms, one of which is an unsaturated carbon atom, react with the dihydroxydibenzanthrone with greater ease than the aliphatic halogen compounds which contain two halogen atoms on the same carbon atom, although in many cases the resulting dyestuffs appear to be identical in constitution. It has also been found that, although the reaction takes place with compounds containing one halogen attached to a carbon which is linked to the remaining part of the molecule through a double bond, the reaction takes place much more readily when there is an additional activating group, such as halogen, connected elsewhere in the aliphatic chain, and more particularly where the halogens are contained in the aliphatic chain on opposite sides of the double bond. Either the Bz-2,Bz-2'-dihydroxydibenzanthrone itself or the alkali metal salts are suitable starting materials in this reaction, although the use of the highly reactive sodium salt of dihydroxydibenzanthrone in a mixture of soda ash and sodium acetate, as more particularly described in U. S. Patent 1,950,366 is preferred. The alkaline condensing agents may be any of those mentioned in U. S. Patent 1,761,624 or U. S. Patent 1,531,261. The alkali metal acetates are preferably employed in place of alkali metal carbonates where the halogen alkene compounds are used, since the stronger alkalies tend to decompose or polymerize the unsaturated compounds. The reaction is preferably carried out at temperatures above 120° C. In those cases where the alkylating agent has a boiling point lower than this temperature, the reaction is preferably carried out in the presence of a higher boiling inert solvent or under superatmospheric pressure. Temperatures of 120–220° C. have been found suitable for carrying out these alkylations, although higher temperatures may, of course, be employed. The dyestuff formation is usually completed within from 4 to 12 hours under reflux temperatures of 120–220° C. While lower temperatures may be employed in certain instances where a highly reactive form of the alkali metal salts of dihydroxydibenzanthrone is used, the time for completing the reaction is materially increased.

Although the chemical structure of the resulting alkyl ethers of the dihydroxydibenzanthrone of this invention cannot be definitely set forth, it is believed that they have the formula as above given, in which one molecule of alkylating agent is reacted with both hydroxy groups of the dihydroxydibenzanthrone giving a 7-membered ring containing two oxygens. In those cases where a dihalogen alkene compound is employed in the process, it has been found that the condensation is apparently effected between the carbon containing the halogen and the double bond leaving at least as an intermediate in the process a compound which contains one atom of halogen. On continued heating or on purification of the resulting dyestuff, such as illustrated more particularly in the following examples Nos. 2 and 3, by a vatting process, the halogen is completely eliminated, giving a dyestuff which is substantially free of halogen and, because of the ease with which it adds bromine directly, apparently contains a double bond. In this description and claims, this formula is therefore used to describe the dyestuffs which are obtained by the process herein disclosed.

The following examples are given to illustrate the invention more fully. The parts given are by weight.

*Example 1*

15 parts of the soda ash salt of Bz-2,Bz-2'-dihydroxydibenzanthrone (prepared according to U. S. Patent 1,950,366 by slurrying Bz-2,Bz-2'-dihydroxydibenzanthrone with an excess of a sodium carbonate solution, then drying and pulverizing the mixture), 12 parts of anhydrous sodium acetate, 10 parts of anhydrous potassium carbonate, and 25 parts of 2,2-dibromopropane are mixed with 100 parts of dry ortho-dichlorobenzene. The mass is heated at reflux temperatures for 16 hours, with continuous distillation of the solvent and the water formed in the reaction. The distillate is collected in a receiver, where the water liberated by the reactions forms a separate layer. The solvent layer of the distillate is continuously returned to the reaction mass. At the end of 16 hours the reaction is stopped and the reaction mass is cooled and filtered at 160–170° C. The filtrate is steam distilled to free from ortho-dichlorobenzene, and the product is filtered off. It may be crystallized from 50 parts of orthodichlorobenzene in the form of fine, bronzy needles which impart a reddish violet coloration when dissolved in strong sulfuric acid. With alkaline hydrosulfite solution, the dye forms a blue vat having a reddish fluorescence, which dyes cotton in bright blue shades which are fast to the action of dilute acids and alkalies.

This compound is believed to have the formula

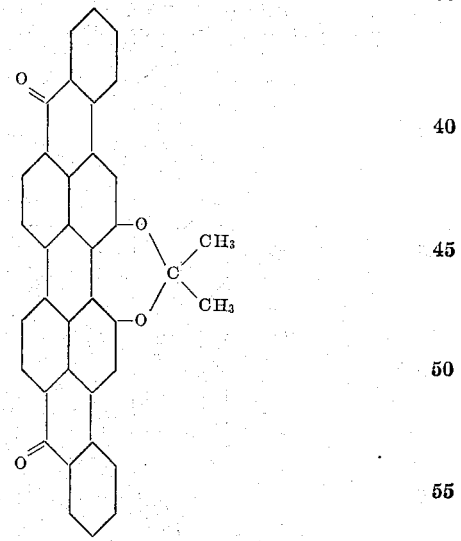

Other dihalogen alkane compounds such as 2,2-dibromobutane and 2,2-dibromohexane, may be substituted for the dibromopropane of this example to give similar bright blue dyestuffs of excellent fastness properties.

*Example 2*

15 parts of the sodium acetate salt of Bz-2, Bz-2'-dihydroxydibenzanthrone (prepared according to U. S. Patent 1,950,366 by slurrying 2 parts of Bz-2,Bz-2' - dihydroxydibenzanthrone with 1 part of sodium acetate in water solution, drying and pulverizing) are added to 100 parts of dry monochlorobenzene. The mass is heated under agitation to reflux temperatures and continuously distilled with return of the distillate as described in Example 1 until the mass is free from water. 25 parts of 1,3-dibromo-2-butene are then added slowly to the reaction mass during 1 hour. The reaction is continued for 16 hours under reflux and the whole reaction mass is steam distilled, filtered, washed alkali-free, and dried. The product is purified by crystallizing 1 part of the crude color from 40 parts of hot ortho-dichlorobenzene. The dye is obtained as uniform needles, which give a reddish violet solution with concentrated sulfuric acid. The dye forms a blue vat with alkaline hydrosulfite solution, having a pronounced reddish fluorescence and dyes and prints cotton in outstandingly bright and strong blue shades, which possess excellent fastness properties. This compound is believed to have the formula

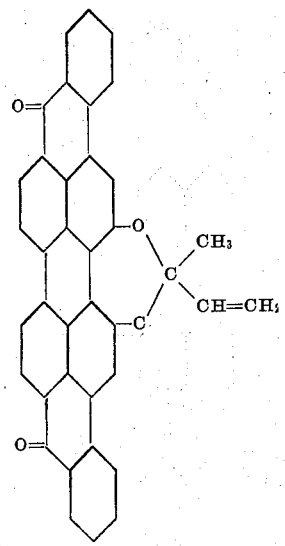

The reaction may also be carried out in ortho-dichlorobenzene instead of in monochlorobenzene. The soda ash salt of Bz-2,Bz-2'-dihydroxydibenzanthrone may be used in place of the sodium acetate salt. Anhydrous sodium acetate may be added to the reaction mass as an additional condensing agent.

*Example 3*

20 parts of the soda ash salt of Bz-2,Bz-2'-dihydroxydibenzanthrone and 16 parts of anhydrous sodium acetate are suspended in 60 parts of 1,3-dichloro-2-butene. The suspension is heated to 125–130° C., and the reaction is run for 14 hours with the continuous distillation and return of distillate as described in Example 1. The reaction mass is then distilled substantially free from solvent. The resulting mass is steam distilled; and the product is filtered off, washed alkali-free, and dried. One part of the dry color may be crystallized from 25 parts of hot ortho-dichlorobenzene giving uniform needles on cooling. The dye dissolves in concentrated sulfuric acid with a reddish violet color, and forms a blue vat having a pronounced reddish fluorescence with alkaline hydrosulfite solution. It dyes and prints cotton in bright blue shades fast to dilute acids and alkalies. After vatting and reoxidizing the dye, it appears to be identical with the product of Example 2 which has been similarly vatted and reoxidized.

The condensation may also be carried out in monochlorobenzene or ortho-dichlorobenzene instead of using excess 1,3-dichloro-2-butene as the solvent. The sodium acetate salt of Bz-2,Bz-2'-dihydroxydibenzanthrone may be used in place of the soda ash salt. Other condensing agents, such as potassium acetate and potassium carbonate may be used together with or in place of sodium acetate. After the water liberated by the reaction has been mechanically separated from the distillate, the solvent layer may be further dried with calcium chloride or with other drying agents, before being returned to the reaction mass.

The crude dye may be purified by crystallization from solvents other than ortho-dichlorobenzene, such as trichlorobenzene or nitrobenzene. The crude dye may also be purified by esterification of the hydroxylated impurities, present in the crude color, by treatment with lauric acid chloride, followed by filtration, as described in detail in our co-pending application Serial No. 209,995. This purification method may be carried out as follows:

10 parts of the dry, crude dye are suspended in a mixture of 60 parts of dry nitrobenzene and 4 parts of dry pyridine. The mass is heated with agitation to 80–85° C., and 4 parts of crude lauric acid chloride are added at this temperature during 1 hour. The charge is then heated to 125–130° C. and held at this temperature for 2 hours. At the end of this time, the charge is cooled to room temperature and filtered. The cake is washed with 10 parts of nitrobenzene, and is then steam distilled free from nitrobenzene in the presence of soda ash. The purified dye is filtered off, washed alkali-free, and dried. In this way any unreacted dihydroxydibenzanthrone which may be present in the crude reaction product is completely removed from the dye, which, however, may still contain a small amount of unvattable material, consisting mainly of inorganic matter present in the initial dihydroxydibenzanthrone. This material may subsequently be removed by vatting the purified dyestuff, and filtering the vat.

Other mono- and dihalogen alkenes, such as 2-bromo-2-butene, 2-bromo-1-hexene, 2,3-dibromo-1-propene, 2,3-dichloro-1-propene, 1-methoxy-3-chloro-2-butene, etc., may be substituted in the above example to give blue dyestuffs having similar dyeing properties.

*Example 4*

25 parts of the soda ash salt of Bz-2,Bz-2'-dihydroxydibenzanthrone and 20 parts of anhydrous sodium acetate are mixed with 100 parts of dry ortho-dichlorobenzene, and the mass heated under continuous distillation with return of the dry distillate until the mass is free from water. A solution of 50 parts of 2-chloro-1,3-butadiene in 480 parts of ortho-dichlorobenzene is added to the reaction mass during 2 hours. The reaction is continued for 15 hours longer under return distillation. 450 parts more of ortho-dichlorobenzene are then added to the reaction mass, and the mixture is filtered at 160–170° C. The filtrate is steam distilled until free from ortho-dichlorobenzene. The crude product which is obtained contains some polymerized material. This may be removed by dissolving the product in pyridine, and adding the solution to an alkaline hydrosulfite vat, which is then filtered in the presence of filter cel. The filtered vat is oxidized, and the recovered dye is filtered off, washed alkali-free, and dried. The dye may then be further purified by crystallizing one part of the material from 20 parts of ortho-dichlorobenzene. The dye is obtained in the form of thin needles which are vatted with alkaline hydrosulfite to give a blue vat having a reddish fluorescence.

The product dyes cotton in bright blue shades fast to dilute acids and alkalies, and imparts a reddish violet color to sulfuric acid. The dye is quite similar to the one obtained in Example 2.

Other butadiene compounds, such as 1,2-dichloro-1,3-butadiene may be substituted in the above example to give similar fast blue dyestuffs. The 1:2-dichloro-1:3-butadiene is believed to give a compound of the formula

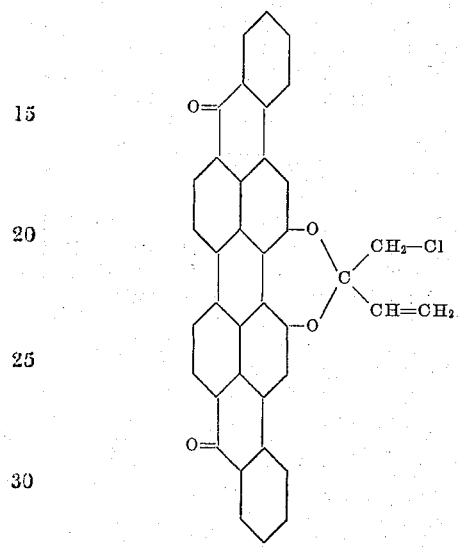

The amount of alkylating agents employed in the above reactions may, of course, be varied from the minimum of 1 mol of the halogen compound to 1 mol of dihydroxydibenzanthrone to a large excess of the alkylating agent which when of sufficiently high boiling point may be used in place of the inert solvent. Other alkaline reacting agents may be employed in place of the alkali metal carbonates or acetates, such as for instance, pyridine or other inorganic alkaline salts, such as, trisodium phosphate. The dyestuffs may be isolated from the fusion by any of the usual methods, such as, filtration of the fusion mass, preferably after dilution with alcohol, steam distillation of the filter cake to free it from the solvent or evaporation of the fusion mass to dryness, followed by the isolation of the pure color by solvent extraction. The crude reaction products may be purified by recrystallization from high boiling solvents, since all of these new ethers of dihydroxydibenzanthrone exhibit fair solubility in inert organic solvents at temperatures above 150° C., whereas they are practically insoluble at room temperature.

The purified colors as obtained above may be converted to color pastes or powders suitable for dyeing and printing by the methods usually employed in the preparation of pastes and powders of the alkylation products of Bz-2:Bz-2'-dihydroxydibenzanthrone, such as, by vatting the purified color in alkaline hydrosulfite solutions and oxidizing the leuco after adding salt to the vat. Acid recrystallizations cannot be employed, since they apparently hydrolyze the ether groups converting the dyestuffs to the original dihydroxydibenzanthrone. These new dyes may be converted to the stable reduction derivatives described in U. S. application 186,750 and they are readily converted to the leuco sulfuric acid esters by the usual procedure.

These new vat dye colors are very suitable for mixing with the vat blues of the indanthrone series to give desirable bright blue dyestuffs of good general fastness properties.

As pointed out above, the chemical structure of the dyestuffs of this application has not been definitely proved and the formulae employed in the specification and claims are given to represent the compounds produced by the processes described and it is to be understood that the formulae employed in the claims are to be construed, like complex organic formulae must generally be construed, as defining the compounds produced by the reactions disclosed in this application.

I claim:

1. The compounds of the following general formula:

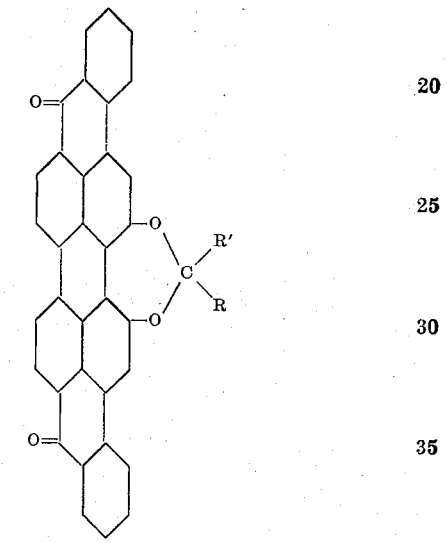

where R' stands for a substituent of the class consisting of —CH₃ and —CH₂—Hal, and R stands for a radical of the class consisting of alkyl and alkylene and halogen alkyl radicals which contain not more than 5 carbon atoms.

2. The alkylation derivative of Bz-2,Bz-2'-dihydroxy-dibenzanthrone which carries the radical

attached to the oxygens in the Bz-2,Bz-2'-positions, which dyestuff dissolves with a reddish-violet color in concentrated sulfuric acid and dyes cotton from a blue alkaline hydrosulfite vat which shows a reddish fluorescence in bright and strong blue shades of excellent fastness properties.

3. The alkylation derivative of Bz-2,Bz-2'-dihydroxy-dibenzanthrone which carries the radical

attached to the oxygens in the Bz-2,Bz-2'-positions, which dyestuff dissolves with a reddish-violet color in concentrated sulfuric acid and dyes cotton from a blue alkaline hydrosulfite vat which shows a reddish fluorescence in bright and strong blue shades of excellent fastness properties.

4. The alkylation derivative of Bz-2,Bz-2'-dihydroxy-dibenzanthrone which carries the radical

attached to the oxygens in the Bz-2,Bz-2'-positions which dyestuff dissolves with a reddish-violet color in concentrated sulfuric acid and dyes cotton from a blue alkaline hydrosulfite vat which shows a reddish fluorescence in bright and strong blue shades of excellent fastness properties.

5. The process for preparing dyestuffs of the dibenzanthrone series which comprises reacting a compound of the class consisting of Bz-2,Bz-2'-dihydroxy-dibenzanthrone and its alkali metal salts with at least one mol of an alkylating agent of the class consisting of those having the general formulae

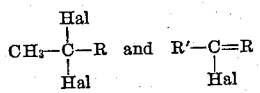

in which R stands for a radical of the class consisting of alkyl, alkylene radicals and their halogen substitution products, and R' stands for a radical of the class consisting of —CH$_3$ and —CH$_2$—Hal, which alkylating agents contain from 2 to 6 carbon atoms.

6. In the process for preparing dyestuffs of the dibenzanthrone series the step which comprises reacting a compound of the class consisting of Bz-2,Bz-2'-dihydroxy-dibenzanthrone and its alkali metal salts with at least one mol of 1,3-dihalogen-2-butene until alkylation is completed.

7. In the process for preparing dyestuffs of the dibenzanthrone series the step which comprises reacting a compound of the class consisting of Bz-2,Bz-2'-dihydroxy-dibenzanthrone and its alkali metal salts with at least one mol of 1,2-dichloro-1,3-butadiene until alkylation is completed.

8. In the process for preparing dyestuffs of the dibenzanthrone series the step which comprises reacting a compound of the class consisting of Bz-2,Bz-2'-dihydroxy-dibenzanthrone and its alkali metal salts with at least one mol of 2,2-dibromo propane until alkylation is completed.

OTTO STALLMANN.